No. 834,499. PATENTED OCT. 30, 1906.
T. L. & T. J. STURTEVANT.
CLUTCH DEVICE.
APPLICATION FILED APR. 2, 1906.
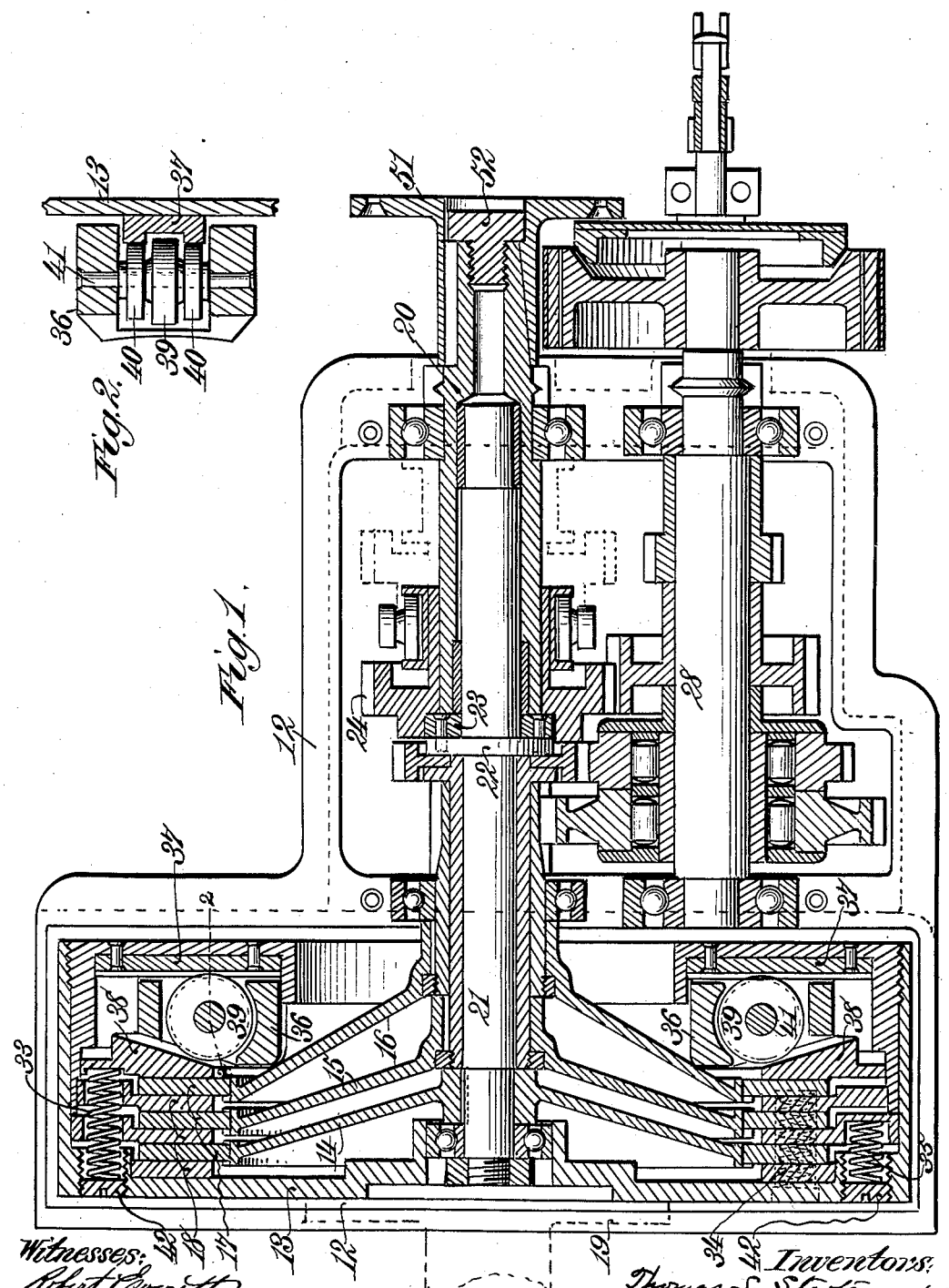
Witnesses:
Inventors:
Thomas L. Sturtevant
Thomas J. Sturtevant
By ... Atty.

UNITED STATES PATENT OFFICE.

THOMAS LEGGETT STURTEVANT, OF QUINCY, AND THOMAS JOSEPH STURTEVANT, OF WELLESLEY, MASSACHUSETTS, ASSIGNORS TO STURTEVANT MILL COMPANY, OF PORTLAND, MAINE, A CORPORATION OF MAINE.

CLUTCH DEVICE.

No. 834,499. Specification of Letters Patent. Patented Oct. 30, 1906.

Application filed April 2, 1906. Serial No. 309,479.

*To all whom it may concern:*

Be it known that we, THOMAS LEGGETT STURTEVANT, residing at Quincy, and THOMAS JOSEPH STURTEVANT, residing at Wellesley, in the county of Norfolk and State of Massachusetts, citizens of the United States, have invented or discovered certain new and useful Improvements in Clutch Devices, of which the following is a specification, reference being had therein to the accompanying drawings.

This invention relates to a clutch-device power-transmitting mechanism more especially adapted for use with motor-vehicles, but which is also suitable for other purposes, the present invention being an improvement upon the invention covered by our United States Patent No. 766,551, granted August 2, 1904. In the device covered by our said patent the clutching elements are forced into frictional engagement with each other by arms or weights moved outward by centrifugal force against the stress of springs, and as the stress of the said springs increases with the outward movements of the weights the power of the latter in forcing the clutching elements into frictional contact with each other became less and less in proportion to the increased speed of rotation as the speed becomes greater. In the present improved construction the clutching elements are forced into frictional engagement with each other by outwardly moving or sliding weights and coöperating inclined surfaces, said weights being preferably provided with rollers to diminish friction. In this improved construction the leverage of the said weights against a coöperating disk or master-plate increases with the outward movements of the weights, due to centrifugal force, in a ratio greater than the increased resistance or stress of the springs which normally hold the clutching elements out of engaging frictional contact and which have a tendency to move the said weights inward as the centrifugal force, due to diminished speed of rotation, decreases. Thus the power of the centrifugal weights in forcing the clutching elements into engagement with each other will be increased with the outward movements of said weights instead of being diminished, as in our former construction.

In the accompanying drawings, Figure 1 is a central sectional view of a clutch-device power-transmitting mechanism embodying the present invention. Fig. 2 is a detail section through one of the centrifugal weights and its guideways on line 2 2, Fig. 1.

Referring to the drawings, 12 denotes a gear-casing which when the invention is to be used in connection with automobiles will preferably be bolted or otherwise rigidly attached to the crank-casing of the engine or motor, the said casing 12 inclosing a fly-wheel 13, which is adapted to contain a lubricant and within which the clutch devices are housed, so that they may run in oil. Within the fly-wheel in the form of the invention herein illustrated are three clutch wheels or shells 14, 15, and 16, the peripheries of which are in notched engagement with disks 17, which are intended to be frictionally engaged with flat rings or disks 18, which are in notched engagement at their peripheries with the inner wall of the said fly-wheel 13. The fly-wheel 13 will in practice be rigidly connected with a driving-shaft or other source of power by means of a hub 19 or otherwise, and when the several clutch devices are out of operation said fly-wheel will of course be free to rotate independently of the driven or power-transmitting hollow shaft 20, which is to be operatively connected with the axle or wheels to be driven. The clutch-wheel 14 is splined directly to a shaft 21, so that the full speed of the fly-wheel will be imparted to the said shaft 21 when the high-speed clutch device (represented by the clutch-wheel 14 and the clutch-disks, which will impart movement to the said wheel 14) is set in operation, as will be hereinafter described.

The shaft 21 is provided with a flange 22, one face of which is constructed to form one member of a grab-clutch 23, the other member of which is formed on the adjacent face of a gear-wheel 24, splined to the hollow power-transmitting shaft 20 and slidingly mounted on said hollow shaft. When the members of this grab-clutch are in engagement, as shown in Fig. 1, and the high-speed clutch-wheel 14 is in clutching engagement with the fly-wheel 13 the full speed of said fly-wheel and of the shaft 21 will be imparted to the driven or power-transmitting shaft 20.

The clutch-wheels 15 and 16 are indirectly connected with the power-transmitting shaft 20 through the gearing and the counter-shaft 28, (shown in Fig. 1,) so as to provide for three speeds and for reverse drive, as fully set forth in our application filed December 7, 1905, No. 290,721, of which application this case, specially relating to the clutch construction, is a division, so that a full description of this change-speed gearing is not here in necessary.

The clutch rings or disks 17 and 18 are normally held out of frictional clutching engagement with each other by springs 33, 34, and 35 and are forced into frictional clutching engagement by centrifugal weights 36, mounted to slide in and out radially of the fly-wheel 13. To this end said fly-wheel is provided with guideways afforded by radially-disposed plates 37, attached to the inner wall of the fly-wheel and fitting in grooves or recesses formed in the said centrifugal weights, so that the latter may move in and out on the guides or guideways afforded by the said plates. To force the clutching-disks into clutching engagement with each other, the centrifugal weights are provided with inclined inner faces to coöperate with the inclined face of a master-plate 38, which bears against one of the clutch rings or disks 17, so that as the centrifugal weights move outward radially the said master-plate will be moved by wedging action toward the said springs 33, 34, and 35 to set the clutch or clutches, the stress of said springs serving when the centrifugal force is relaxed by a retardation of the speed of rotation of the fly-wheel to force the centrifugal weights inward by wedging action, causing said weights to move inward down the inclined face of said master-plate.

To facilitate the inward and outward radial movements of the centrifugal weights, said weights are each preferably provided with wheels or rollers 39 and 40, mounted for free rotation on pins 41. The wheels or rollers 40, which are somewhat smaller in diameter than the wheels or rollers 39, bear against guides or runways afforded by the plates 37, while the wheels or rollers 39 bear against the master-plate 38, but are received in grooves in the plates 37, so as to be free from contact with said plates. The antifriction construction afforded by the wheels or rollers 39 and 40 makes the sliding or in-and-out radial movements of the centrifugal weights more sensitive and much more easily effected than they otherwise would be, as will be understood.

The stress of the springs 33, 34, and 35 may be regulated by means of the screw-plugs 42 bearing against the outer ends of said springs, the low-speed springs 33 bearing at their inner ends against the master-plate 38, while the other springs 34 and 35 bear against the clutch rings or disks 18.

Fixed to the outer end of the hollow shaft 20 is a hub 51, which is preferably splined to the tapering outer end of the said shaft and held to the latter by a headed screw 52, tapped in said hollow shaft 20. The said hub 51 will in practice be connected with the mechanism to be driven.

The operation of the invention is as follows: When the fly-wheel 13 is at rest or is rotating very slowly, the centrifugal weights 36 occupy the inner inoperative positions shown in Fig. 1, being held in such positions by the stress of the springs 33, 34, and 35. When the said centrifugal weights are in such inner positions, the clutch rings or disks 17 and 18 are not in holding frictional engagement with each other, and the fly-wheel is therefore free to rotate independently of the clutch and gearing mechanisms. When the speed of rotation of the fly-wheel is increased, so that the centrifugal force of the weights 36 will be sufficient to overcome the stress of the low-speed springs 33, the said weights will be moved outward radially and the master-plate 38 will be caused by the wedging action of the centrifugal weights to compress said springs and produce a clutching engagement between the inner disks 17 and 18, so as to impart rotation to the low-speed clutch-wheel 16, and thus through the connections hereinbefore described will cause said clutch-wheel to impart rotation to the power-transmitting or driven shaft 20. A further increase of speed of rotation of the fly-wheel will successively cause the second-speed clutch-wheel 15 and the high-speed clutch-wheel 14 to be set in operation when the speed of rotation of the fly-wheel is sufficient to cause by centrifugal action the weights 36 to move outward, so as to overcome the stress of the other sets of springs 34 and 35.

Having thus described our invention, we claim and desire to secure by Letters Patent—

1. In a power-transmitting mechanism, the combination with clutching-disks, of radially-movable, wedge-formed weights which, by centrifugal action, automatically force said clutching-disks into frictional engagement with each other, and springs opposing the action of said weights.

2. In a power-transmitting mechanism, the combination with clutching-disks, of radially-movable, wedge-formed weights, running on rollers, and which, by centrifugal action, automatically force said clutching-disks into frictional engagement with each other, and springs opposing the action of said weights.

3. In a power-transmitting mechanism, the combination with a fly-wheel provided interiorly with guides or ways, friction clutch-disks inclosed within said fly-wheel, wedge-formed weights radially movable on said guides or ways and operating by centrifugal action to force the said clutch-disks into frictional engagement with each other, and springs opposing the action of said weights.

4. In a power-transmitting mechanism, the combination with a fly-wheel provided interiorly with guides or ways, friction clutch-devices inclosed within said fly-wheel, wedge-formed weights radially movable on said guides and arranged to operate by centrifugal action to force the said clutch devices into frictional engagement with each other, and springs opposing the action of said weights, said weights being provided with rollers to render their movements more easy and sensitive.

5. In a power-transmitting mechanism, the combination with a multiple-disk friction clutch device, of radially-movable wedge-formed weights for automatically forcing the clutching parts into frictional engagement with each other by centrifugal action, and springs opposing the action of said weights.

6. In a power-transmitting mechanism, the combination with a multiple-disk friction clutch device, of radially-movable, wedge-formed weights, running on rollers, for automatically forcing the clutching parts into frictional engagement with each other by centrifugal action, and springs opposing the action of said weights.

7. In a power-transmitting mechanism, the combination with a series of friction-disks and a master-plate having an inclined outer face, of radially-sliding, centrifugally-operating wedge-formed weights for forcing said disks into clutching action, and springs opposing the action of said weights.

8. In a power-transmitting mechanism, the combination with a series of friction-disks and a master-plate having an inclined outer face, of radially-sliding, centrifugally-operating wedge-formed weights for forcing said disks into clutching action, springs for opposing the action of said weights, and a fly-wheel within which said parts are inclosed.

In testimony whereof we affix our signatures in presence of two witnesses.

THOMAS LEGGETT STURTEVANT.
THOMAS JOSEPH STURTEVANT.

Witnesses:
H. G. ALLBRIGHT,
GRACE G. GODFREY.